United States Patent
Hwang et al.

(10) Patent No.: US 9,745,417 B2
(45) Date of Patent: *Aug. 29, 2017

(54) COPOLYCARBONATE AND COMPOSITION COMPRISING THE SAME

(71) Applicant: LG CHEM, LTD., Seoul (KR)

(72) Inventors: Young Young Hwang, Daejeon (KR); Hyong Min Bahn, Daejeon (KR); Jung Jun Park, Daejeon (KR); Moo Ho Hong, Daejeon (KR); Ki Jae Lee, Daejeon (KR); Young Wook Son, Daejeon (KR); Byoung Kyu Chun, Daejeon (KR); Un Ko, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/024,309

(22) PCT Filed: Nov. 16, 2015

(86) PCT No.: PCT/KR2015/012291
§ 371 (c)(1),
(2) Date: Mar. 24, 2016

(87) PCT Pub. No.: WO2016/089024
PCT Pub. Date: Jun. 9, 2016

(65) Prior Publication Data
US 2016/0369047 A1    Dec. 22, 2016

(30) Foreign Application Priority Data

Dec. 4, 2014 (KR) .................. 10-2014-0173005
Sep. 10, 2015 (KR) .................. 10-2015-0128296
Nov. 13, 2015 (KR) .................. 10-2015-0159658

(51) Int. Cl.
*C08L 69/00* (2006.01)
*C08G 64/18* (2006.01)
(Continued)

(52) U.S. Cl.
CPC ........... *C08G 64/085* (2013.01); *C08G 64/06* (2013.01); *C08G 64/1666* (2013.01); *C08G 64/1691* (2013.01); *C08G 64/18* (2013.01); *C08G 64/186* (2013.01); *C08G 64/24* (2013.01); *C08G 64/307* (2013.01); *C08G 64/38* (2013.01); *C08G 77/448* (2013.01); *C08J 5/00* (2013.01); *C08K 5/3475* (2013.01); *C08L 69/00* (2013.01); *C08L 69/005* (2013.01); *C08L 83/04* (2013.01); *C08L 83/10* (2013.01); *C08L 2201/10* (2013.01); *C08L 2205/02* (2013.01); *C08L 2205/025* (2013.01)

(58) Field of Classification Search
CPC ........................ C08G 64/085; C08G 77/448
See application file for complete search history.

(56) References Cited

U.S. PATENT DOCUMENTS 3,819,744 A * 6/1974 Buchner ............. C08G 77/448
                                                                525/464
5,137,949 A   8/1992 Paul et al.
(Continued)

FOREIGN PATENT DOCUMENTS

CN       101124282 A     2/2008
CN       101585961 A     11/2009
(Continued)

OTHER PUBLICATIONS

Chemical Abstract of US2016/0251481, Mar. 2016, 3 pages.
Chemical Abstract registry No. 163617-O0-3, Jun. 1995, 1 page.

*Primary Examiner* — David Buttner
(74) *Attorney, Agent, or Firm* — Dentons US LLP

(57) ABSTRACT

Disclosed is a polycarbonate composition including a polycarbonate; and a copolycarbonate, where the copolycarbonate includes an aromatic polycarbonate-based first repeating unit; and aromatic polycarbonate-based second repeating units having siloxane bonds, which include a repeating unit represented by Chemical Formula 2 and a repeating unit represented by Chemical Formula 3, where the copolycarbonate has an impact strength at room temperature of 840 to 1000 J/m as measured at 23° C. in accordance with ASTM D256 (⅛ inch, Notched Izod), and the copolycarbonate satisfies Equation 1:

[Chemical Formula 2]

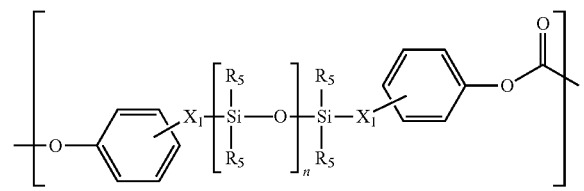

[Chemical Formula 3]

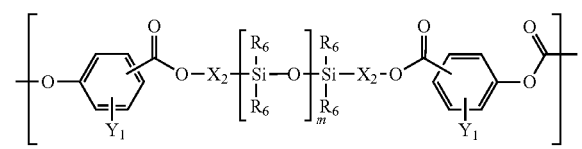

$TS/TS_0 \geq 0.80$.    [Equation 1]

The copolycarbonate in the composition provides an improved chemical resistance and impact strength simultaneously.

12 Claims, No Drawings

(51) Int. Cl.

| | | |
|---|---|---|
| *C08G 77/448* | (2006.01) | |
| *C08G 64/08* | (2006.01) | |
| *C08G 64/38* | (2006.01) | |
| *C08J 5/00* | (2006.01) | |
| *C08G 64/16* | (2006.01) | |
| *C08G 64/06* | (2006.01) | |
| *C08G 64/30* | (2006.01) | |
| *C08K 5/3475* | (2006.01) | |
| *C08L 83/04* | (2006.01) | |
| *C08G 64/24* | (2006.01) | |
| *C08L 83/10* | (2006.01) | |

(56) References Cited

U.S. PATENT DOCUMENTS

| | | | |
|---|---|---|---|
| 5,324,454 | A | 6/1994 | Takata et al. |
| 5,380,795 | A | 1/1995 | Gosens et al. |
| 5,455,310 | A | 10/1995 | Hoover et al. |
| 5,502,134 | A | 3/1996 | Okamoto et al. |
| 5,608,026 | A | 3/1997 | Hoover et al. |
| 5,783,651 | A | 7/1998 | König et al. |
| 5,932,677 | A | 8/1999 | Hoover et al. |
| 6,001,929 | A | 12/1999 | Nodera et al. |
| 6,252,013 | B1 | 6/2001 | Banach et al. |
| 6,281,286 | B1 | 8/2001 | Chorvath et al. |
| 6,780,956 | B2 | 8/2004 | Davis |
| 7,135,538 | B2 | 11/2006 | Glasgow et al. |
| 7,332,559 | B2 | 2/2008 | Hong et al. |
| 7,432,327 | B2 | 10/2008 | Glasgow |
| 7,498,401 | B2 | 3/2009 | Agarwal |
| 7,524,919 | B2 | 4/2009 | Hoover et al. |
| 7,691,304 | B2 | 4/2010 | Agarwal et al. |
| 7,709,581 | B2 | 5/2010 | Glasgow et al. |
| 7,718,733 | B2 | 5/2010 | Juikar et al. |
| 8,030,379 | B2 | 10/2011 | Nodera et al. |
| 8,084,134 | B2 | 12/2011 | Malinoski et al. |
| 8,124,683 | B2 | 2/2012 | Jung et al. |
| 8,389,648 | B2 | 3/2013 | Adoni et al. |
| 8,466,249 | B2 | 6/2013 | Gallucci et al. |
| 8,552,096 | B2 | 10/2013 | Li et al. |
| 8,912,290 | B2 | 12/2014 | Huggins et al. |
| 8,933,186 | B2 | 1/2015 | Bahn et al. |
| 8,962,780 | B2 | 2/2015 | Higaki et al. |
| 8,981,017 | B2 | 3/2015 | Ishikawa |
| 9,062,164 | B2 | 6/2015 | Kim et al. |
| 9,080,021 | B2 | 7/2015 | Ishikawa et al. |
| 9,102,832 | B2 | 8/2015 | Sybert et al. |
| 9,255,179 | B2 | 2/2016 | Park et al. |
| 2003/0027905 | A1 | 2/2003 | Mahood et al. |
| 2003/0065122 | A1 | 4/2003 | Davis |
| 2004/0200303 | A1 | 10/2004 | Inoue et al. |
| 2006/0148986 | A1 | 7/2006 | Glasgow et al. |
| 2007/0093629 | A1 | 4/2007 | Silva et al. |
| 2007/0135569 | A1 | 6/2007 | De Rudder |
| 2007/0241312 | A1 | 10/2007 | Hikosaka |
| 2007/0258412 | A1 | 11/2007 | Schilling et al. |
| 2008/0015289 | A1 | 1/2008 | Siripurapu |
| 2008/0081895 | A1 | 4/2008 | Lens et al. |
| 2008/0230751 | A1 | 9/2008 | Li et al. |
| 2009/0087761 | A1 | 4/2009 | Fukushima et al. |
| 2009/0326183 | A1 | 12/2009 | Schultz et al. |
| 2010/0233603 | A1 | 9/2010 | Hikosaka |
| 2012/0123034 | A1 | 5/2012 | Morizur et al. |
| 2012/0251750 | A1 | 10/2012 | Sybert et al. |
| 2012/0252985 | A1 | 10/2012 | Rosenquist et al. |
| 2012/0283393 | A1 | 11/2012 | Ishikawa |
| 2013/0035441 | A1 | 2/2013 | De Brouwer et al. |
| 2013/0082222 | A1 | 4/2013 | Aoki |
| 2013/0186799 | A1 | 7/2013 | Stam et al. |
| 2013/0190425 | A1 | 7/2013 | Zhu et al. |
| 2013/0267665 | A1 | 10/2013 | Huggins et al. |
| 2013/0274392 | A1 | 10/2013 | Morizur et al. |
| 2013/0289224 | A1* | 10/2013 | Bae ............... C08G 64/186 525/474 |
| 2013/0309474 | A1 | 11/2013 | Peek et al. |
| 2013/0313493 | A1 | 11/2013 | Wen et al. |
| 2013/0317142 | A1 | 11/2013 | Chen et al. |
| 2013/0317146 | A1 | 11/2013 | Li et al. |
| 2013/0317150 | A1 | 11/2013 | Wan et al. |
| 2013/0331492 | A1 | 12/2013 | Sharma |
| 2014/0106208 | A1 | 4/2014 | Ishikawa et al. |
| 2014/0148559 | A1 | 5/2014 | Kim et al. |
| 2014/0178943 | A9 | 6/2014 | Shibuya et al. |
| 2014/0179843 | A1 | 6/2014 | van der Mee et al. |
| 2014/0323623 | A1 | 10/2014 | Miyake et al. |
| 2015/0057423 | A1 | 2/2015 | Kim et al. |
| 2015/0175802 | A1 | 6/2015 | Sybert et al. |
| 2015/0197633 | A1 | 7/2015 | van der Mee et al. |
| 2015/0210854 | A1 | 7/2015 | Aoki |
| 2015/0218371 | A1 | 8/2015 | Lee et al. |
| 2015/0307706 | A1 | 10/2015 | Rosenquist et al. |
| 2015/0315380 | A1 | 11/2015 | Bahn et al. |
| 2015/0344623 | A1 | 12/2015 | Park et al. |
| 2015/0368484 | A1 | 12/2015 | Shishaku et al. |
| 2016/0002410 | A1* | 1/2016 | Iyer ............... C08G 77/448 525/464 |
| 2016/0122477 | A1 | 5/2016 | Rhee et al. |
| 2016/0251481 | A1 | 9/2016 | Hwang et al. |
| 2016/0297926 | A1* | 10/2016 | Hwang ............... C08G 64/307 |
| 2016/0326312 | A1 | 11/2016 | Park et al. |
| 2016/0326313 | A1 | 11/2016 | Son et al. |
| 2016/0326314 | A1 | 11/2016 | Son et al. |
| 2016/0326321 | A1 | 11/2016 | Park et al. |
| 2016/0369047 | A1 | 12/2016 | Hwang et al. |
| 2016/0369048 | A1 | 12/2016 | Park et al. |

FOREIGN PATENT DOCUMENTS

| | | |
|---|---|---|
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 105899576 A | 8/2016 |
| EP | 0284865 A2 | 3/1988 |
| EP | 0685507 B1 | 10/1998 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08-234468 A | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 5547953 B2 | 7/2014 |
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |

(56) References Cited

FOREIGN PATENT DOCUMENTS

| | | |
|---|---|---|
| KR | 1020080083278 A | 9/2008 |
| KR | 10-2009-0033093 A | 4/2009 |
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 10-2015-0119823 A | 10/2015 |
| KR | 10-1563269 B1 | 10/2015 |
| KR | 2015-0134457 A | 12/2015 |
| TW | 201241043 A | 10/2012 |
| WO | 2012060516 A1 | 5/2012 |
| WO | 2013/051557 A1 | 4/2013 |
| WO | 2013-058214 A1 | 4/2013 |
| WO | 2013/073709 A1 | 5/2013 |
| WO | 2013/100606 A1 | 7/2013 |
| WO | 2013-115538 A1 | 8/2013 |
| WO | 2013/175445 A2 | 11/2013 |
| WO | 2013/175455 A1 | 11/2013 |
| WO | 2014042252 A1 | 3/2014 |
| WO | 2014/058033 A1 | 4/2014 |
| WO | 2014/119827 A1 | 8/2014 |
| WO | 2014/139110 A1 | 9/2014 |
| WO | 2014-144673 A1 | 9/2014 |
| WO | 2015/011669 A2 | 1/2015 |
| WO | 2015/015445 A2 | 2/2015 |
| WO | WO-2015/041441 * | 3/2015 |

\* cited by examiner

COPOLYCARBONATE AND COMPOSITION COMPRISING THE SAME

CROSS-REFERENCE TO RELATED APPLICATION(S)

This application is a National Stage Application of International Application No. PCT/KR2015/012291, filed Nov. 16, 2015, and claims the benefit of Korean Patent Application No. 10-2015-0159658, filed Nov. 13, 2015, Korean Patent Application No. 10-2015-0128296, filed Sep. 10, 2015, and Korean Patent Application No. 10-2014-0173005, filed Dec. 4, 2014, the contents of which are incorporated herein by reference in their entirety for all purposes as if fully set forth below.

TECHNICAL FIELD

The present invention relates to a copolycarbonate and a composition comprising the same, and more specifically to a copolycarbonate being economically produced, and having improved chemical resistance and impact strength simultaneously, and to a composition comprising the same.

BACKGROUND OF ART

Polycarbonate resins are prepared by condensation-polymerization of an aromatic diol such as bisphenol A with a carbonate precursor such as a phosgene and have excellent impact strength, dimensional stability, heat resistance and transparency. Thus, the polycarbonate resins have application in a wide range of uses, such as exterior materials of electrical and electronic products, automobile parts, building materials, and optical components.

Recently, in order to apply these polycarbonate resins to more various fields, many studies have been made to obtain desired physical properties by copolymerizing two or more aromatic diol compounds having different structures from each other and introducing units having different structures in a main chain of the polycarbonate.

Especially, studies for introducing a polysiloxane structure in a main chain of the polycarbonate have been undergone, but most of these technologies have disadvantages in that production costs are high, and the chemical resistance and the impact strength are not improved simultaneously.

Given the above circumstances, the present inventors have conducted intensive studies to overcome the above-mentioned disadvantages encountered with the prior arts and develop a copolycarbonate having improved chemical resistance and impact strength simultaneously, and found that a copolycarbonate in which a specific siloxane compound is introduced in a main chain of the polycarbonate as described below satisfies the above-described properties. The present invention has been completed on the basis of such a finding.

DETAILED DESCRIPTION OF THE INVENTION

Technical Problem

It is an object of the present invention to provide a copolycarbonate having improved chemical resistance and impact strength simultaneously.

It is another object of the present invention to provide a polycarbonate composition comprising the above-mentioned copolycarbonate and a polycarbonate.

It is a further object of the present invention to provide an article comprising the above-mentioned copolycarbonate or the polycarbonate composition.

Technical Solution

In order to achieve these objects, the present invention provides a copolycarbonate which comprises an aromatic polycarbonate-based first repeating unit; and one or more aromatic polycarbonate-based second repeating units having siloxane bonds, and satisfies the following Equation 1:

$$TS/TS_0 \geq 0.80 \qquad \text{[Equation 1]}$$

in the Equation 1, $TS_0$ is tensile stress measured in accordance with ASTM D638, and TS represents tensile stress measured in accordance with ASTM D638, after contacted with ethyl acetate for 168 hours in accordance with ASTM D543 (PRACTICE B).

As used herein, Equation 1 refers to chemical resistance of the copolycarbonate according to the present invention, which means a change in the tensile stress caused by contacting of the copolycarbonate with a specific solvent for a specific period of time. If $TS/TS_0$ in the Equation 1 is 1, it means that there is no change in the tensile stress of the copolycarbonate regardless of a specific solvent contacted with. Therefore, this means that as the value of $TS/TS_0$ increases, the chemical resistance is excellent.

In particular, the copolycarbonate according to the present invention has a low change in the tensile stress, particularly when contacted with ethyl acetate. Preferably, in the Equation 1, $TS/TS_0$ is not less than 0.81, not less than 0.82, not less than 0.83, not less than 0.84, not less than 0.85, not less than 0.86, not less than 0.87, not less than 0.88, not less than 0.89, or not less than 0.90. Further, in the Equation 1, $TS/TS_0$ may be, for example, not more than 1, or not more than 0.99.

In addition, the copolycarbonate according to the present invention has a low change in the tensile stress even when contacted with toluene in addition to ethyl acetate. Specifically, the copolycarbonate according to the present invention satisfies the Equation 2 below:

$$TS/TS_0 \geq 0.50 \qquad \text{[Equation 2]}$$

in the above Equation 2, $TS_0$ is tensile stress measured in accordance with ASTM D638, and TS represents tensile stress measured in accordance with ASTM D638, after contacted with toluene for 168 hours in accordance with ASTM D543 (PRACTICE B).

Preferably, in the Equation 2, $TS/TS_0$ is not less than 0.51, not less than 0.52, not less than 0.53, not less than 0.54, or not less than 0.55. In addition, in the Equation 2, $TS/TS_0$ may be, for example, not more than 1, not more than 0.99, not more than 0.98, not more than 0.97, not more than 0.96, or not more than 0.95.

The copolycarbonate according to the present invention has a low change in the tensile strength even when contacted with hydrochloric acid, sodium hydroxide, or methanol in addition to ethyl acetate and toluene. When $TS/TS_0$ is applied to hydrochloric acid, sodium hydroxide or methanol as shown in Equation 1 or 2, the value is not less than 0.95 and not more than 1.

Further, the copolycarbonate according to the present invention has excellent impact strength, for example, impact strength at low temperature and impact strength at room temperature in addition to the above-described excellent chemical resistance.

The impact strength at low temperature is measured at −30° C. in accordance with ASTM D256 (⅛ inch, Notched Izod). Preferably, the impact strength at low temperature is not less than 600 J/m, not less than 650 J/m, not less than 700 J/m, not less than 710 J/m, not less than 720 J/m, not less than 730 J/m, not less than 740 J/m, or not less than 750 J/m. In addition, the impact strength at low temperature is excellent when the value is higher, and thus it is not limited to any upper limit value. As one example, however, it may be not more than 990 J/m, not more than 980 J/m, not more than 970 J/m, not more than 960 J/m, not more than 950 J/m, not more than 940 J/m, not more than 930 J/m, not more than 920 J/m or not more than 910 J/m.

The impact strength at room temperature is measured in accordance with ASTM D256 (⅛ inch, Notched Izod). Preferably, the impact strength at room temperature is not less than 850 J/m, not less than 860 J/m, not less than 870 J/m, not less than 880 J/m, not less than 890 J/m, not less than 900 J/m, not less than 910 J/m, not less than 920 J/m, not less than 930 J/m, not less than 940 J/m, not less than 950 J/m, or not less than 960 J/m. Further, the impact strength at room temperature is excellent when the value is higher, and thus it is not limited to any upper limit value. As one example, however, it may be not more than 990 J/m, not more than 980 J/m, or not more than 970 J/m.

Further, the copolycarbonate according to the present invention has a weight average molecular weight of 1,000 to 100,000 g/mol, and preferably 15,000 to 35,000 g/mol.

More preferably, the above weight average molecular weight is not less than 20,000 g/mol, not less than 21,000 g/mol, not less than 22,000 g/mol, not less than 23,000 g/mol, not less than 24,000 g/mol, not less than 25,000 g/mol, not less than 26,000 g/mol, not less than 27,000 g/mol, or not less than 28,000 g/mol. Further, the above weight average molecular weight is not more than 34,000 g/mol, not more than 33,000 g/mol, not more than 32,000 g/mol, or not more than 31,000 g/mol.

Further, preferably, the copolycarbonate according to the present invention has a melt index of 3 to 10 as measured in accordance with ASTM D1238 (conditions of 300° C. and 1.2 kg). Preferably, the melt index is not less than 4, not less than 5, or not less than 6; and not more than 9, or not more than 8.

Further, preferably, the copolycarbonate according to the present invention may comprise two kinds of aromatic polycarbonate-based second repeating units having siloxane bonds.

Further, in the copolycarbonate according to the present invention, the mole ratio of the aromatic polycarbonate-based first repeating unit and the one or more aromatic polycarbonate-based second repeating units having siloxane bonds may be preferably 1:0.001-0.006, and/or the weight ratio thereof may be 1:0.01-0.03.

Further, in the copolycarbonate according to the present invention, specifically, the aromatic polycarbonate-based first repeating unit is formed by reacting an aromatic diol compound and a carbonate precursor, and it may be preferably represented by the following Chemical Formula 1:

[Chemical Formula 1]

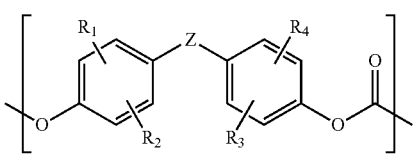

in the Chemical Formula 1, $R_1$, $R_2$, $R_3$, and $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Preferably, in the Chemical Formula 1, $R_1$, $R_2$, $R_3$, and $R_4$ are each independently hydrogen, methyl, chloro, or bromo.

Further, Z is preferably a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl, or diphenylmethylene. Further, preferably, Z is cyclohexane-1,1-diyl, O, S, SO, $SO_2$, or CO.

Preferably, the repeating unit represented by Chemical Formula 1 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

As used herein, "derived from aromatic diol compounds" means that a hydroxy group of the aromatic diol compound and a carbonate precursor are reacted to form the repeating unit represented by Chemical Formula 1.

For example, when bisphenol A, which is an aromatic diol compound, and triphosgene, which is a carbonate precursor, are polymerized, the repeating unit represented by Chemical Formula 1 is represented by the following Chemical Formula 1-1:

[Chemical Formula 1-1]

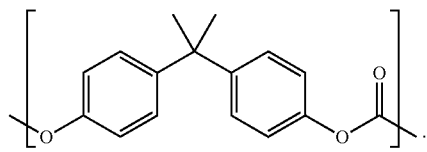

The carbonate precursor used herein may include one or more selected from the group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis(diphenyl) carbonate, phosgene, triphosgene, diphosgene, bromo phosgene and bishaloformate. Preferably, triphosgene or phosgene may be used.

Further, in the copolycarbonate according to the present invention, the one or more aromatic polycarbonate-based second repeating units having siloxane bonds are formed by reacting one or more siloxane compounds and a carbonate precursor, and they may comprise preferably a repeating unit represented by the following Chemical Formula 2 and a repeating unit represented by the following Chemical Formula 3:

[Chemical Formula 2]

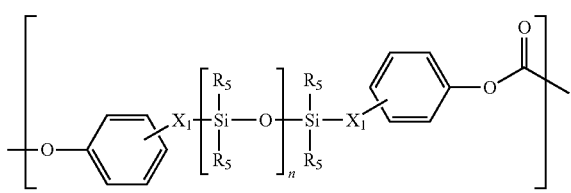

in the Chemical Formula 2, each of $X_1$ is independently $C_{1-10}$ alkylene, each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n is an integer of 10 to 200,

[Chemical Formula 3]

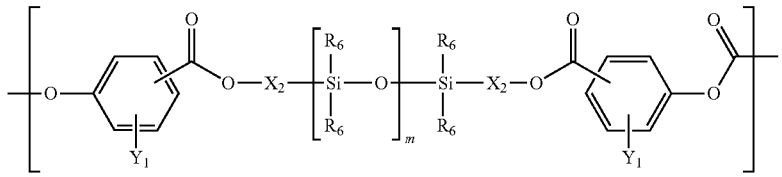

in the Chemical Formula 3, each of $X_2$ is independently $C_{1-10}$ alkylene, each of $Y_1$ is independently hydrogen, $C_{1-6}$ alkyl, halogen, hydroxy, $C_{1-6}$ alkoxy, or $C_{6-20}$ aryl, each of $R_6$ is independently hydrogen; or $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; $C_{1-10}$ haloalkyl; or $C_{6-20}$ aryl, and m is an integer of 10 to 200.

In the Chemical Formula 2, each of $X_1$ is independently preferably $C_{2-10}$ alkylene, more preferably $C_{2-4}$ alkylene, and most preferably propane-1,3-diyl.

Also, preferably, each of $R_5$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. In addition, each of $R_5$ is independently preferably $C_{1-10}$ alkyl, more preferably $C_{1-6}$ alkyl, more preferably $C_{1-3}$ alkyl and most preferably methyl.

Further, preferably, n is an integer of not less than 10, not less than 15, not less than 20, not less than 25, not less than 30, not less than 31, or not less than 32; and not more than 50, not more than 45, not more than 40, not more than 39, not more than 38, or not more than 37.

In the Chemical Formula 3, each of $X_2$ is independently preferably $C_{2-10}$ alkylene, more preferably $C_{2-6}$ alkylene, and most preferably isobutylene.

Further, preferably, $Y_1$ is hydrogen.

Further, preferably, each of $R_6$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. Further, preferably, each of $R_6$ is independently $C_{1-10}$ alkyl, more preferably $C_{1-6}$ alkyl, more preferably $C_{1-3}$ alkyl, and most preferably methyl.

Preferably, m is an integer of not less than 40, not less than 45, not less than 50, not less than 55, not less than 56, not less than 57, or not less than 58; and not more than 80, not more than 75, not more than 70, not more than 65, not more than 64, not more than 63, or not more than 62.

The repeating unit represented by Chemical Formula 2 and the repeating unit represented by Chemical Formula 3 are, derived from a siloxane compound represented by the following Chemical Formula 2-1 and a siloxane compound represented by the following Chemical Formula 3-1, respectively:

[Chemical Formula 2-1]

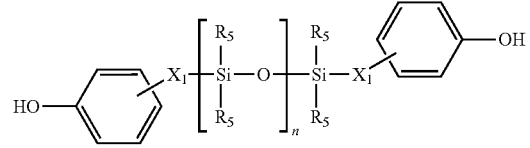

in the Chemical Formula 2-1, $X_1$, $R_5$ and n are the same as previously defined.

[Chemical Formula 3-1]

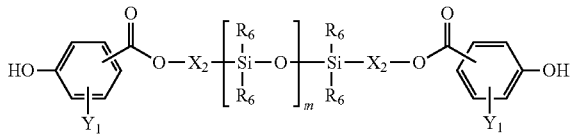

in the Chemical Formula 3-1, $X_2$, $Y_1$, $R_6$ and m are the same as previously defined.

As used herein, "derived from a siloxane compound" means that a hydroxy group of the respective siloxane compound and a carbonate precursor are reacted to form the repeating unit represented by Chemical Formula 2 and the repeating unit represented by Chemical Formula 3. Further, the carbonate precursors that can be used for the formation of the repeating units represented by Chemical Formulae 2 and 3 are the same as those described for the carbonate precursor that can be used for the formation of the repeating unit represented by Chemical Formula 1 described above.

The methods for preparing the siloxane compound represented by Chemical Formula 2-1 and the siloxane compound represented by Chemical Formula 3-1 are represented by the following Reaction Schemes 1 and 2:

[Reaction Scheme 1]

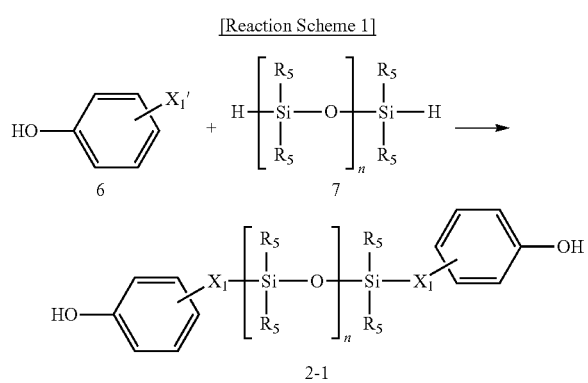

in the Reaction Scheme 1,
$X_1'$ is $C_{2-10}$ alkenyl, and
$X_1$, $R_5$ and n are as previously defined,

[Reaction Scheme 2]

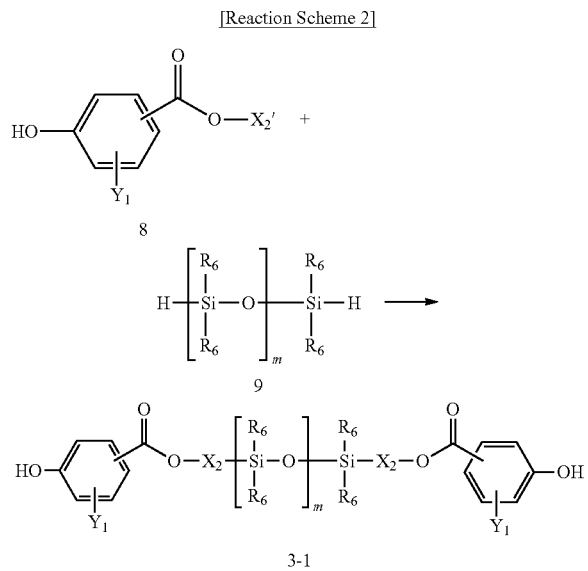

in the Reaction Scheme 2,
$X_2'$ is $C_{2-10}$ alkenyl, and
$X_2$, $Y_1$, $R_6$ and m are as previously defined.

In the Reaction Scheme 1 and Reaction Scheme 2, the reaction is preferably conducted in the presence of a metal catalyst. As the metal catalyst, a Pt catalyst is preferably used. The Pt catalyst used herein may include one or more selected from the group consisting of Ashby catalyst, Karstedt catalyst, Lamoreaux catalyst, Speier catalyst, $PtCl_2$ (COD), $PtCl_2(benzonitrile)_2$ and $H_2PtBr_6$. The metal catalyst may be used in an amount of not less than 0.001 parts by weight, not less than 0.005 parts by weight, or not less than 0.01 parts by weight; and not more than 1 part by weight, not more than 0.1 part by weight, or not more than 0.05 part by weight, based on 100 parts by weight of the compounds represented by the Chemical Formulae 7 or 9.

Further, the above reaction temperature is preferably 80 to 100° C. Further, the above reaction time is preferably 1 to 5 hours.

In addition, the compounds represented by Chemical Formulae 7 or 9 can be prepared by reacting an organodisiloxane and an organocyclosiloxane in the presence of an acid catalyst, and n and m may be adjusted by adjusting the amount of the reactants used. The reaction temperature is preferably 50 to 70° C. Also, the reaction time is preferably 1 to 6 hours.

The above organodisiloxane may include one or more selected from the group consisting of tetramethyldisiloxane, tetraphenyldisiloxane, hexamethyldisiloxane and hexaphenyldisiloxane. In addition, the above organocyclosiloxane may include, for example, organocyclotetrasiloxane. As one example thereof, octamethylcyclotetrasiloxane, octaphenylcyclotetrasiloxane or the like may be included.

The above organodisiloxane may be used in an amount of not less than 0.1 parts by weight, or not less than 2 parts by weight; and not more than 10 parts by weight or not more than 8 parts by weight, based on 100 parts by weight of the organocyclosiloxane.

The above acid catalyst that may be used herein includes one or more selected from the group consisting of $H_2SO_4$, $HClO_4$, $AlCl_3$, $SbCl_5$, $SnCl_4$ and acid clay (fuller's earth). Further, the acid catalyst may be used in an amount of not less than 0.1 parts by weight, not less than 0.5 parts by weight, or not less than 1 part by weight; and not more than 10 parts by weight, not more than 5 parts by weight or not more than 3 parts by weight, based on 100 parts by weight of the organocyclosiloxane.

In particular, by adjusting the content of the repeating unit represented by Chemical Formula 2 and the repeating unit represented by Chemical Formula 3, the chemical resistance and the impact strength of the copolycarbonate can be improved simultaneously. Preferably, the weight ratio between the above repeating units may be from 1:99 to 99:1. Preferably, the weight ratio is from 3:97 to 97:3, from 5:95 to 95:5, from 10:90 to 90:10, or from 15:85 to 85:15, and more preferably from 20:80 to 80:20. The weight ratios of the above repeating units correspond to the weight ratios of siloxane compounds, for example, the siloxane compound represented by Chemical Formula 2-1 and the siloxane compound represented by Chemical Formula 3-1.

Preferably, the repeating unit represented by Chemical Formula 2 is represented by the following Chemical Formula 2-2:

[Chemical Formula 2-2]

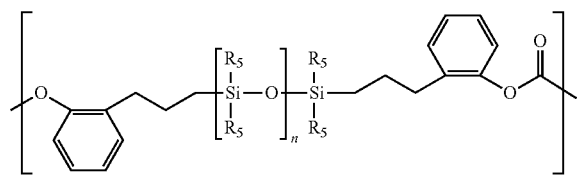

in the Chemical Formula 2-2, $R_5$ and n are the same as previously defined. Preferably, $R_5$ is methyl.

Also, preferably, the repeating unit represented by Chemical Formula 3 is represented by the following Chemical Formula 3-2:

[Chemical Formula 3-2]

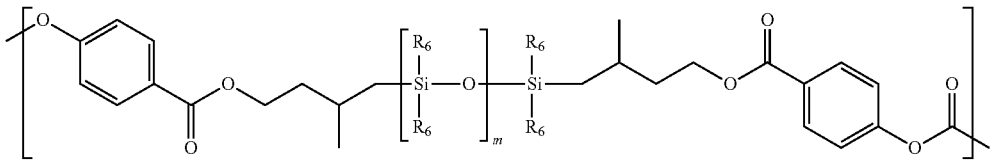

in the Chemical Formula 3-2, $R_6$ and m are the same as previously defined. Preferably, $R_6$ is methyl.

Further, preferably, the copolycarbonate according to the present invention comprises all of the repeating unit represented by Chemical Formula 1-1, the repeating unit represented by Chemical Formula 2-2, and the repeating unit represented by Chemical Formula 3-2.

Further, the present invention provides a method for preparing a copolycarbonate comprising a step of polymerizing the aromatic diol compound, the carbonate precursor and one or more siloxane compounds.

The aromatic diol compound, the carbonate precursor and one or more siloxane compounds are the same as previously described.

During the polymerization, one or more siloxane compounds may be used in an amount of not less than 0.1% by weight, not less than 0.5% by weight, not less than 1% by weight, or not less than 1.5% by weight; and not more than 20% by weight, not more than 10% by weight, not more than 7% by weight, not more than 5% by weight, not more than 4% by weight, not more than 3% by weight, or not more than 2% by weight, based on 100% by weight in total of the aromatic diol compound, the carbonate precursor and one or more siloxane compounds. Also, the above aromatic dial compound may be used in an amount of not less than 40% by weight, not less than 50% by weight, or not less than 55% by weight; and not more than 80% by weight, not more than 70% by weight, or not more than 65% by weight, based on 100% by weight in total of the aromatic diol compound, the carbonate precursor and one or more siloxane compounds. The above carbonate precursor may be used in an amount of not less than 10% by weight, not less than 20% by weight, or not less than 30% by weight; and not more than 60% by weight, not more than 50% by weight, or not more than 40% by weight, based on 100% by weight in total of the aromatic dial compound, the carbonate precursor and the one or more siloxane compounds.

Further, as the polymerization method, an interfacial polymerization method may be used as one example. In this case, there is an effect in that the polymerization reaction is possible at a low temperature and an atmospheric pressure, and thus control of molecular weight is easy. The above interfacial polymerization is preferably conducted in the presence of an acid binder and an organic solvent. Furthermore, the above interfacial polymerization may comprise, for example, the steps of conducting pre-polymerization, then adding a coupling agent and conducting polymerization again. In this case, the copolycarbonate having a high molecular weight may be obtained.

The materials used in the interfacial polymerization are not particularly limited as long as they may be used in the polymerization of polycarbonates. The used amount thereof may be controlled as required.

The acid binding agent may include, for example, alkali metal hydroxides such as sodium hydroxide or potassium hydroxide, or amine compounds such as pyridine.

The organic solvent is not particularly limited as long as it is a solvent that may be usually used in the polymerization of polycarbonate. As one example, halogenated hydrocarbon such as methylene chloride or chlorobenzene may be used.

Further, during the interfacial polymerization, a reaction accelerator, for example, a tertiary amine compound such as triethylamine, tetra-n-butyl ammonium bromide and tetra-n-butylphosphonium bromide, a quaternary ammonium compound or a quaternary phosphonium compound may be further used for accelerating the reaction.

In the interfacial polymerization, the reaction temperature is preferably from 0 to 40° C. and the reaction time is preferably from 10 minutes to 5 hours. Further, during the interfacial polymerization reaction, pH is preferably maintained at 9 or more, or 11 or more.

In addition, the interfacial polymerization may be conducted by further including a molecular weight modifier. The molecular weight modifier may be added before the initiation of polymerization, during the initiation of polymerization, or after the initiation of polymerization.

As the above molecular weight modifier, mono-alkylphenol may be used. As one example, the mono-alkylphenol is one or more selected from the group consisting of p-tert-butylphenol, p-cumyl phenol, decyl phenol, dodecyl phenol, tetradecyl phenol, hexadecyl phenol, octadecyl phenol, eicosyl phenol, docosyl phenol and triacontyl phenol, and preferably p-tert-butylphenol. In this case, the effect of adjusting the molecular weight control is great.

The above molecular weight modifier is contained, for example, in an amount of not less than 0.01 parts by weight, not less than 0.1 parts by weight, or not less than 1 part by weight; and not more than 10 parts by weight, not more than 6 parts by weight, or not more than 5 parts by weight, based on 100 parts by weight of the aromatic diol compound. Within this range, the required molecular weight may be obtained.

In addition, the present invention provides a polycarbonate composition comprising the above-mentioned copolycarbonate and polycarbonate. The copolycarbonate may be used alone, but it may be used together with the polycarbonate as needed to control the physical property of the copolycarbonate.

The above polycarbonate is distinguished from the copolycarbonate according to the present invention in that a polysiloxane structure is not introduced in a main chain of the polycarbonate.

Preferably, the above polycarbonate comprises a repeating unit represented by the following Chemical Formula 4:

[Chemical Formula 4]

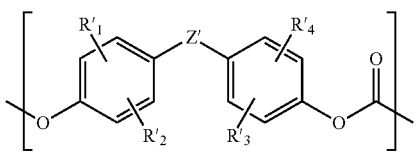

In the Chemical Formula 4, $R'_1$, $R'_2$, $R'_3$ and $R'_4$ are each independently hydrogen, $C_{1-10}$ alkyl, $C_{1-10}$ alkoxy or halogen, and $Z'$ is $C_{1-10}$ alkylene unsubstituted or substituted with phenyl, $C_{3-15}$ cycloalkylene unsubstituted or substituted with $C_{1-10}$ alkyl, O, S, SO, $SO_2$ or CO.

Further, preferably, the above polycarbonate has a weight average molecular weight of 15,000 to 35,000 g/mol. More preferably, the above weight average molecular weight is not less than 20,000 g/mol, not less than 21,000 g/mol, not less than 22,000 g/mol, not less than 23,000 g/mol, not less than 24,000 g/mol, not less than 25,000 g/mol, not less than 26,000 g/mol, not less than 27,000 g/mol, or not less than 28,000 g/mol. Further, the above weight average molecular weight is not more than 34,000 g/mol, not more than 33,000 g/mol, or not more than 32,000 g/mol.

The repeating unit represented by Chemical Formula 4 is formed by reacting the aromatic diol compound and the carbonate precursor. The aromatic diol compound and the carbonate precursor that may be used herein are the same as previously described for the repeating unit represented by Chemical Formula 1.

Preferably, $R'_1$, $R'_2$, $R'_3$, $R'_4$ and $Z'$ in Chemical Formula 4 are the same as previously described for $R_1$, $R_2$, $R_3$, $R_4$ and $Z$ in Chemical Formula 1, respectively.

Further, preferably, the repeating unit represented by Chemical Formula 4 is represented by the following Chemical Formula 4-1:

[Chemical Formula 4-1]

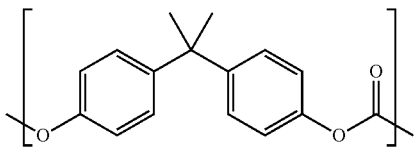

In addition, the present invention provides an article comprising the above-mentioned copolycarbonate or the polycarbonate composition.

Preferably, the above article is an injection molded article. In addition, the article may further comprise, for example, one or more selected from the group consisting of antioxidants, heat stabilizers, light stabilizers, plasticizers, antistatic agents, nucleating agents, flame retardants, lubricants, impact reinforcing agents, fluorescent brightening agents, ultraviolet absorbers, pigments and dyes.

The method for preparing the article may comprise the steps of mixing the copolycarbonate according to the present invention and additives such as antioxidants with a mixer, extrusion-molding the mixture with an extruder to produce a pellet, drying the pellet and then injecting the dried pellet with an injection molding machine.

Advantageous Effects

As set forth above, according to the present invention, the copolycarbonate in which a specific siloxane compound is introduced in a main chain of the polycarbonate has an effect of improving chemical resistance and impact strength simultaneously.

DETAILED DESCRIPTION OF THE EMBODIMENTS

Below, preferred embodiments will be provided in order to assist in the understanding of the present disclosure. However, these examples are provided only for illustration of the present invention, and should not be construed as limiting the present invention to these examples.

Preparation Example 1

AP-PQMS (n=34)

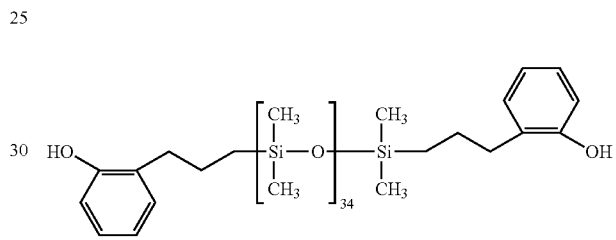

47.60 g (160 mmol) of octamethylcyclotetrasiloxane and 2.40 g (17.8 mmol) of tetramethyldisiloxane were mixed. The mixture was then placed in 3 L flask together with 1 part by weight of acid clay (DC-A3) compared to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the terminal-unmodified polyorganosiloxane thus prepared was 34 when confirmed through $^1$H NMR.

To the resulting terminal-unmodified polyorganosiloxane, 4.81 g (35.9 mmol) of 2-allylphenol and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as AP-PDMS (n=34). AP-PDMS was a pale yellow oil and the repeating unit (n) was 34 when confirmed through $^1$H NMR using a Varian 500 MHz, and further purification was not required.

Preparation Example 2

MBHB-PDMS (m=58)

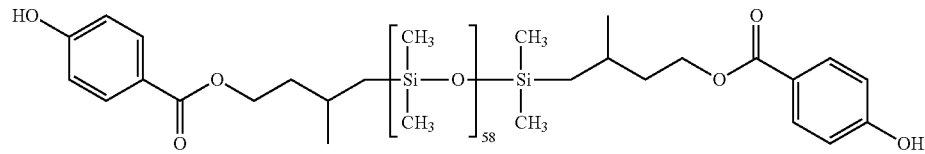

47.60 g (160 mmol) of octamethylcyclotetrasiloxane and 1.5 g (11 mmol) of tetramethyldisiloxane were mixed. The mixture was then introduced in 3 L flask together with 1 part by weight of acid clay (DC-A3) compared to 100 parts by weight of octamethylcyclotetrasiloxane, and reacted at 60° C. for 4 hours. After completion of the reaction, the reaction product was diluted with ethyl acetate and quickly filtered using a celite. The repeating unit (m) of the terminal-unmodified polyorganosiloxane thus prepared was 58 when confirmed through $^1$H NMR.

To the resulting terminal-unmodified polyorganosiloxane, 6.13 g (29.7 mmol) of 3-methylbut-3-enyl 4-hydroxybenzoate and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as MBHB-PDMS (m=58). MBHB-PDMS was pale yellow oil and the repeating unit (m) was 58 when confirmed through $^1$H NMR using a Varian 500 MHz, and further purification was not required.

Preparation Example 3

Eucienol-PDMS

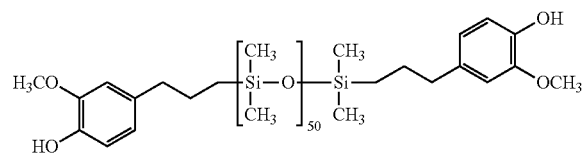

47.60 g (160 mmol) of octamethylcyclotetrasiloxane and 1.7 g (13 mmol) of tetramethyldisiloxane were mixed. The mixture was then placed in 3 L flask together with 1 part by weight of acid clay (DC-A3) compared to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the terminal-unmodified polyorganosiloxane thus prepared was 50 when confirmed through $^1$H NMR.

To the resulting terminal-unmodified polyorganosiloxane, 6.13 g (29.7 mmol) of Eugenol and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as Eugenol-PDMS. Eugenol-PDMS was pale yellow oil and the repeating unit (n) was 50 when confirmed through $^1$H NMR using a Varian 500 MHz, and further purification was not required.

Example 1

1784 g of water, 385 g of NaOH and 232 g of BPA (bisphenol A) were introduced in a polymerization reactor, and dissolved with mixing under a $N_2$ atmosphere. 4.3 g of PTBP (para-tert butylphenol) and the mixed solution (weight ratio of 90:10) of 5.91 g of AP-PDMS (n=34) prepared in Preparation Example 1 and 0.66 g of MBHB-PDMS (m=58) prepared in Preparation Example 2 were dissolved in MC (methylene chloride) and added thereto. Subsequently, 128 g of TPG (triphosgene) was dissolved in MC and a dissolved TPG solution was added thereto and reacted for 1 hour while maintaining pH of the TPG solution at 11 or more. After 10 minutes, 46 g of TEA (triethylamine) was added thereto to conduct a coupling reaction. After a total reaction time of 1 hour and 20 minutes, pH was lowered to 4 to remove TEA, and pH of a produced polymer was adjusted to neutral pH of 6 to 7 by washing three times with distilled water. The polymer obtained was re-precipitated in a mixed solution of methanol and hexane, and then dried at 120° C. to give a final copolycarbonate.

Example 2

The copolycarbonate was prepared in the same method as in Example 1, except that the mixed solution (weight ratio of 95:5) of 6.24 g of AP-PDMS (n=34) prepared in Preparation Example 1 and 0.33 g of MBHB-PDMS (m=58) prepared in Preparation Example 2 was used.

Comparative Example 1

1784 g of water, 385 g of NaOH and 232 g of BPA (bisphenol A) were added to a polymerization reactor, and dissolved with mixing under a $N_2$ atmosphere. 4.3 g of PTBP (para-tert butylphenol) and 6.57 g of AP-PDMS prepared in Preparative Example 1 were dissolved in MC (methylene chloride) and added thereto. Subsequently, 128 g of TPG (triphosgene) was dissolved in MC and a dissolved TPG solution added thereto and reacted for 1 hour while maintaining pH of the TPG solution at 11 or more. After 10 minutes, 46 g of TEA (triethylamine) was added thereto to conduct a coupling reaction. After a total reaction time of 1 hour and 20 minutes, pH was lowered to 4 to remove TEA, and pH of a produced polymer was adjusted to neutral pH of 6 to 7 by washing three times with distilled water. The polymer obtained was re-precipitated in a mixed solution of methanol and hexane, and then dried at 120° C. to give a final copolycarbonate.

Comparative Example 2

The copolycarbonate was prepared by the same method as in Comparative Example 1, except that Eugenol-PDMS prepared in Preparation Example 3 instead of AP-PDMS (n=34) prepared in Preparation Example 1 was used.

Comparative Example 3

The copolycarbonate was prepared by the same method as in Comparative Example 1, except that AP-PDMS (n=34) prepared in Preparation Example 1 was not used.

Experimental Example

Confirmation of Characteristics of Copolycarbonate

The weight average molecular weight of the copolycarbonates prepared in the examples and comparative examples were measured by GPC using PC Standard with Agilent 1200 series.

In addition, with respect to 1 part by weight of the respective copolycarbonates prepared in the examples and comparative examples, 0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritol tetrastearate were added thereto, and the resulting mixture was pelletized using a φ30 mm twin-screw extruder provided with a vent, and was injection-molded at a cylinder temperature of 300° C. and a mold temperature of 80° C. using an injection molding machine N-20C (JSW, Ltd.) to prepare a desired specimen.

The characteristics of the above specimens were determined in the following manner and the results were shown in Table 1 below.

1) Chemical resistance: the tensile stress (kg/cm$^2$) was measured (TS$_0$) in accordance with ASTM D638 (specimen thickness: 3.2 mm). Then, after selecting a solvent as shown in Table 1 below, experiments were conducted based on JIG Strain R1.0 in accordance with ASTM D543 (PRACTICE B). A cotton cloth (2 cm×2 cm) was placed on the center of each specimen at room temperature (23° C.). The solvent was dropped on the cloth enough to be volatilized every day and the specimen was in contact with the solvent for 168 hours. After the experiment was completed, the solvent on the specimen was completely removed with a clean cloth, and the tensile stress was again measured (TS) in accordance with ASTM D638 to calculate TS/TS$_0$.

2) Impact strength at room temperature: measured at 23° C. in accordance with ASTM D256 (⅛ inch, Notched Izod).

3) Impact strength at low temperature: measured at −30° C. in accordance with ASTM D256 (⅛ inch, Notched Izod).

4) Melt index (MI): measured in accordance with ASTM D1238 (conditions of 300° C. and 1.2 kg).

As shown in Table 1 above, the copolycarbonate according to the present invention (Examples 1 and 2) exhibited superior chemical resistance as compared with Comparative Examples 1 to 3, and particularly, the difference was significant when ethyl acetate and toluene were used as the solvent. Also, examples exhibited superior impact strength at low temperature and impact strength at room temperature as compared with comparative examples.

Accordingly, it could be confirmed that the copolycarbonate according to the present invention exhibited improved chemical resistance and impact strength simultaneously.

The invention claimed is:
1. A polycarbonate composition comprising:
a polycarbonate; and
a copolycarbonate,
wherein the copolycarbonate comprises: an aromatic polycarbonate-based first repeating unit; and aromatic polycarbonate-based second repeating units having siloxane bonds, wherein the second repeating units comprise a repeating unit represented by Chemical Formula 2 and a repeating unit represented by Chemical Formula 3,
wherein the copolycarbonate has an impact strength at room temperature of 840 to 1000 J/m as measured at 23° C. in accordance with ASTM D256 (⅛ inch, Notched Izod), and
wherein the copolycarbonate satisfies Equation 1:

[Chemical Formula 2]

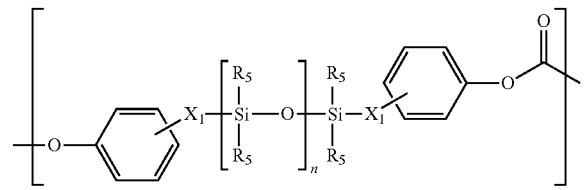

in Chemical Formula 2,
each of X$_1$ is independently C$_{1-10}$ alkylene,
each of R$_5$ is independently hydrogen; C$_{1-15}$ alkyl unsubstituted or substituted with oxiranyl, oxiranyl-substituted C$_{1-10}$ alkoxy, or C$_{6-20}$ aryl; halogen; C$_{1-10}$ alkoxy; allyl; C$_{1-10}$ haloalkyl; or C$_{6-20}$ aryl, and
n is an integer of 10 to 50,

TABLE 1

| | | Example 1 | Example 2 | Comparative Example 1 | Comparative Example 2 | Comparative Example 3 |
|---|---|---|---|---|---|---|
| Chemical resistance (sovent) (TS/TS$_0$) | Standard | 1 | 1 | 1 | 1 | 1 |
| | HCl | 0.99 | 0.99 | 0.99 | 0.98 | 0.89 |
| | NaOH | 0.98 | 0.97 | 0.97 | 0.94 | 0.90 |
| | Ethyl Acetate | 0.93 | 0.89 | 0.74 | 0.76 | 0.63 |
| | MeOH | 1 | 1 | 0.99 | 0.95 | 0.91 |
| | Toluene | 0.56 | 0.53 | 0.41 | 0.50 | 0.37 |
| Impact strength at room temperature (J/m) | | 889 | 839 | 651 | 802 | 870 |
| Impact strength at low temperature (J/m) | | 731 | 718 | 533 | 679 | 194 |
| Weight average molecular weight | | 30,200 | 29,800 | 24,900 | 28,900 | 31,300 |
| Melt index (g/10 min) | | 8 | 9 | 12 | 10 | 11 |

[Chemical Formula 3]

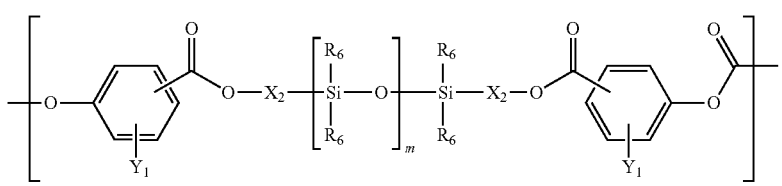

in Chemical Formula 3,
each of $X_2$ is independently $C_{1-10}$ alkylene,
each of $Y_1$ is independently hydrogen, $C_{1-6}$ alkyl, halogen, hydroxy, $C_{1-6}$ alkoxy, or $C_{6-20}$ aryl,
each of $R_6$ is independently hydrogen; or $C_{1-5}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
m is an integer of 55 to 80, $$TS/TS_0 \geq 0.80 \qquad [\text{Equation 1}]$$

in Equation 1,
$TS_0$ is tensile stress measured in accordance with ASTM D638, and
TS represents tensile stress measured in accordance with ASTM D638, after contacted with ethyl acetate for 168 hours in accordance with ASTM D543 (PRACTICE B).

2. The polycarbonate composition of claim 1, wherein the copolycarbonate satisfies Equation 2:

$$TS/TS_0 \geq 0.50 \qquad [\text{Equation 2}]$$

in Equation 2,
$TS_0$ is tensile stress measured in accordance with ASTM D638, and
TS represents tensile stress measured in accordance with ASTM D638, after contacted with toluene for 168 hours in accordance with ASTM D543 (PRACTICE B).

3. The polycarbonate composition of claim 1, wherein the copolycarbonate has an impact strength at low temperature of 600 to 1000 J/m as measured at −30° C. in accordance with ASTM D256 (⅛ inch, Notched Izod).

4. The polycarbonate composition of claim 1, wherein the copolycarbonate has a weight average molecular weight of 1,000 to 100,000 g/mol.

5. The polycarbonate composition of claim 1, wherein the first repeating unit is represented by Chemical Formula 1:

[Chemical Formula 1]

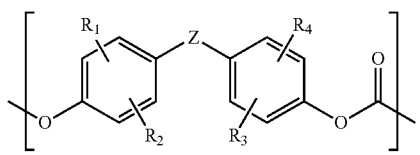

in Chemical Formula 1,
$R_1$, $R_2$, $R_3$, and $R_4$ are each independently hydrogen, $C_{1-10}$ alkyl, $C_{1-10}$ alkoxy, or halogen, and
Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

6. The polycarbonate composition of claim 5, wherein the repeating unit represented by Chemical Formula 1 is derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

7. The polycarbonate composition of claim 5, wherein the Chemical Formula 1 is represented by the following Chemical Formula 1-1:

[Chemical Formula 1-1]

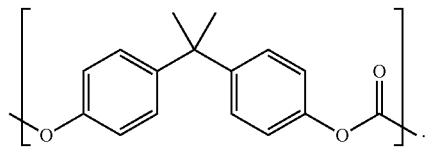

8. The polycarbonate composition of claim 1, wherein a weight ratio of the repeating unit represented by Chemical Formula 2 and the repeating unit represented by Chemical Formula 3 is 1:99 to 99:1.

9. The polycarbonate composition of claim 1, wherein the repeating unit represented by Chemical Formula 2 is represented by the following Chemical Formula 2-2:

[Chemical Formula 2-2]

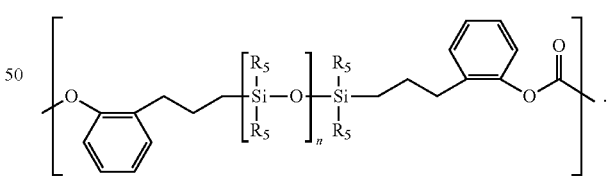

10. The polycarbonate composition of claim 1, wherein the repeating unit represented by Chemical Formula 3 is represented by the following Chemical Formula 3-2:

[Chemical Formula 3-2]

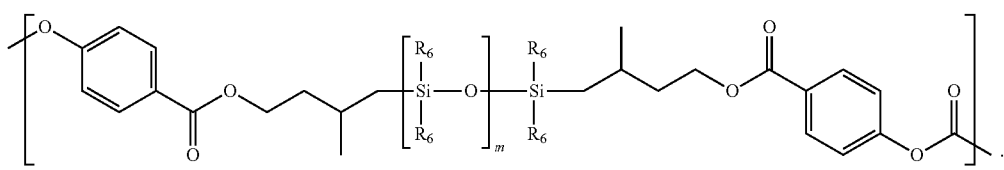

11. The polycarbonate composition of claim 1, wherein the polycarbonate comprises a repeating unit represented by Chemical Formula 4:

[Chemical Formula 4]

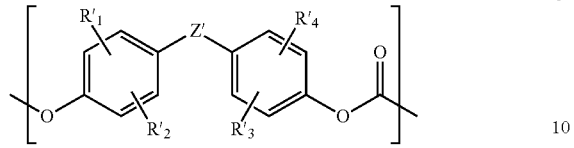

in Chemical Formula 4, $R'_1$, $R'_2$, $R'_3$ and $R'_4$ are each independently hydrogen, $C_{1-10}$ alkyl, $C_{1-10}$ alkoxy, or halogen, and $Z'$ is $C_{1-10}$ alkylene unsubstituted or substituted with phenyl, $C_{3-15}$ cycloalkylene unsubstituted or substituted with $C_{1-10}$ alkyl, O, S, SO, $SO_2$ or CO.

12. The polycarbonate composition of claim 1, wherein a polysiloxane structure is not introduced in a main chain of the polycarbonate.

* * * * *